United States Patent
Finkelstein (10) Patent No.: US 10,559,088 B2
(45) Date of Patent: Feb. 11, 2020

(54) EXTENDING PREVIOUSLY TRAINED DEEP NEURAL NETWORKS

(71) Applicant: Microsoft Technology Licensing, LLC, Redmond, WA (US)

(72) Inventor: Erich-Soren Finkelstein, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 48 days.

(21) Appl. No.: 15/968,694

(22) Filed: May 1, 2018

(65) Prior Publication Data

US 2019/0340779 A1 Nov. 7, 2019

(51) Int. Cl.
*G06T 7/70* (2017.01)
*G06N 3/04* (2006.01)
*G06K 9/66* (2006.01)
*G06N 3/08* (2006.01)

(52) U.S. Cl.
CPC ............. *G06T 7/70* (2017.01); *G06K 9/66* (2013.01); *G06N 3/04* (2013.01); *G06N 3/08* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 8,317,657 B2 | 11/2012 | Thukral et al. |
| 9,031,812 B2 | 5/2015 | Roberts et al. |
| 9,639,746 B2 | 5/2017 | Bulzacki |
| 2010/0241600 A1* | 9/2010 | Krichevskiy ............ G06N 3/08 706/21 |

(Continued)

FOREIGN PATENT DOCUMENTS

| CN | 102103408 A | 6/2011 |
| WO | 2017078886 A1 | 5/2017 |

OTHER PUBLICATIONS

Mannini, et al., "Machine Learning Methods for Classifying Human Physical Activity from On-Body Accelerometers", In Journal of Sensors, vol. 10, Issue 02, Feb. 1, 2010, pp. 1154-1175.

(Continued)

*Primary Examiner* — Vikkram Bali
(74) *Attorney, Agent, or Firm* — Alleman Hall Creasman & Tuttle LLP (57) ABSTRACT

Sensor data is provided to a deep neural network previously trained to detect a feature within the physical environment. Result signals are received from the neural network, and the computing system determines if the feature is present within the physical environment based on the result signals. Responsive to determining that the feature is present, the computing system implements a function of a rule assigned to the feature. Responsive to determining that the feature is not present, the computing system determines whether one or more activation parameters of the neural network have been met indicative of an alternative feature being present within the physical environment. An indication that the activation parameters have been met is output by the computing system, enabling the rule to be extended to the alternative feature.

20 Claims, 6 Drawing Sheets

(56) References Cited

U.S. PATENT DOCUMENTS

| | | |
|---|---|---|
| 2013/0179110 A1 | 7/2013 | Lee |
| 2015/0248297 A1 | 9/2015 | Rasband et al. |
| 2016/0261528 A1 | 9/2016 | Blahnik et al. |
| 2018/0089505 A1 | 3/2018 | El-Khamy et al. |
| 2018/0276333 A1* | 9/2018 | Njie ................... G06N 3/04 |
| 2019/0073586 A1* | 3/2019 | Chen ................... G06N 7/005 |
| 2019/0188285 A1* | 6/2019 | Scheau ............ G06F 16/9535 |

OTHER PUBLICATIONS

"International Search Report and Written Opinion Issued in PCT Application No. PCT/US2019/028426", dated Aug. 14, 2019, 14 Pages.

\* cited by examiner

EXTENDING PREVIOUSLY TRAINED DEEP NEURAL NETWORKS

BACKGROUND

Artificial neural networks (ANNs) may be used by computing systems to learn tasks, such as identifying whether a particular object is present within an image. Neural networks include a collection of interconnected nodes that receive an input signal from an upstream node or source, process that input signal by applying a function to obtain a result, and provide the result to a downstream node or process. Neural networks may be trained by providing training data to the network to generate a result that can be compared to a desired result. In the case of supervised training, the training data may be pre-labeled with the desired result that serves as a supervisory signal. Functions applied at the nodes may be parametrized according to learnable parameters, and the result generated by the network can be adjusted closer to the desired result by adjusting the learnable parameters based on the supervisory signal.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to an aspect of the present disclosure, a computing system receives sensor data from one or more sensors monitoring a physical environment. The sensor data is provided to a deep neural network previously trained to detect a feature within the physical environment. The deep neural network has a plurality of connected nodes including one or more input nodes that receive the sensor data, and one or more output nodes that output result signals responsive to the sensor data. The result signals are received from the neural network, and the computing system determines if the feature is present within the physical environment based on the result signals.

Responsive to determining that the feature is present within the physical environment based on the result signals, the computing system implements a function of a rule assigned to the feature. Responsive to determining that the feature is not present within the physical environment based on the result signals, the computing system determines whether one or more activation parameters of the neural network have been met indicative of an alternative feature being present within the physical environment. An indication that the activation parameters have been met is output by the computing system, enabling assignment of the rule and its corresponding function to be extended to the alternative feature.

DETAILED DESCRIPTION

Computing systems may support personal assistant services for human users that are responsive to a variety of natural language input, body gesture input, and other forms of input. Personal assistant services may be used, for example, to monitor a physical environment, such as a home or work facility for the presence of features within the physical environment. Such features may include visible, audible, and direct forms of user input, and other events that may be of interest in monitoring for a variety of purposes including recording, controlling other devices, or reporting.

Computing systems offering personal assistant services may utilize artificial neural networks (ANNs) to implement or improve the services. Neural networks may be used in combination with rule-based control of personal assistant services to enable users to assign a rule having a function to the detection of a particular feature within the physical environment by the neural network.

According to an aspect of the present disclosure, result signals output by a neural network that are indicative of a feature being present within the physical environment may be extended to a previously established rule that is assigned to an existing feature for which the neural network was previously trained to detect. Neural networks include a collection of interconnected nodes that receive an input signal from an upstream node or source, process that input signal by applying a function to obtain a result signal, and output the result signal to downstream node or process. Generally, each node will have a fixed function (e.g., "sigmoid activation" or "long short-term memory node") but the function is parameterized by learnable parameters, so that the overall function of the neural network is changed by changing the parameters. Deep neural networks refer to the use of many intermediate nodes arranged in successive layers between input nodes and output nodes of the network. By relaxing an activation threshold of one or more intermediate nodes of a deep neural network, the relaxed activation thresholds may enable the deep neural network to detect an alternative feature that the deep neural network was not previously trained to detect (e.g., by satisfying the original activation threshold). Selective relaxation of activation thresholds at intermediate nodes may enable the deep neural network to detect alternative features that differ from yet are related to the features that the neural network was previously trained to detect. For example, an alternative feature detected through selective relaxation of activation thresholds may refer to a genus or another species of a genus of which the original feature is a species. These alternative features may be of value to users in extending rules and their associated functions from previously trained features to the alternative features.

Figure 1:
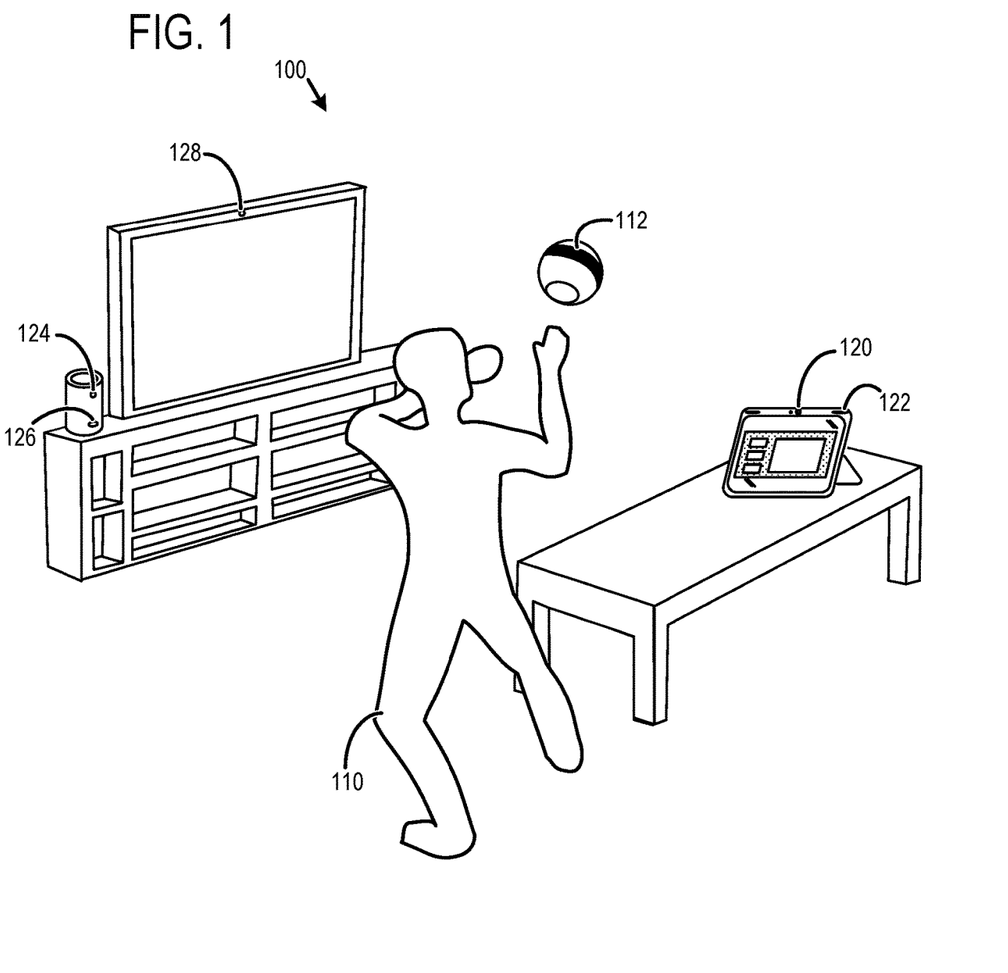
FIG. 1 depicts an example in which a computing system monitors a physical environment.

FIG. 1 depicts an example in which a computing system monitors a physical environment 100. Within physical environment 100, a human subject 110 is engaged in an activity, such as catching or throwing a ball 112. The computing system observes this activity via one or more sensors, including a camera 120 and a microphone 122 of a first device (e.g., a tablet computer), a camera 124 and a microphone 126 of a second device (e.g., a personal assistant computer), and a camera 128 of a third device (e.g., a smart television). Any one or more of the cameras/devices listed above may be used to individually or cooperatively monitor physical environment, and the depiction of three separate devices is by no means required.

Cameras 120, 124, and/or 128 capture image data of the physical environment from, different perspectives, and they may each capture image data of different regions of the physical environment that are not captured by the other cameras. Similarly, microphones 122 and 126 capture audio data of the physical environment from, different perspectives, and they may each capture audio data of different regions of the physical environment that are not captured by the other microphone. Nonetheless, a single device may instead be used.

Figure 2:
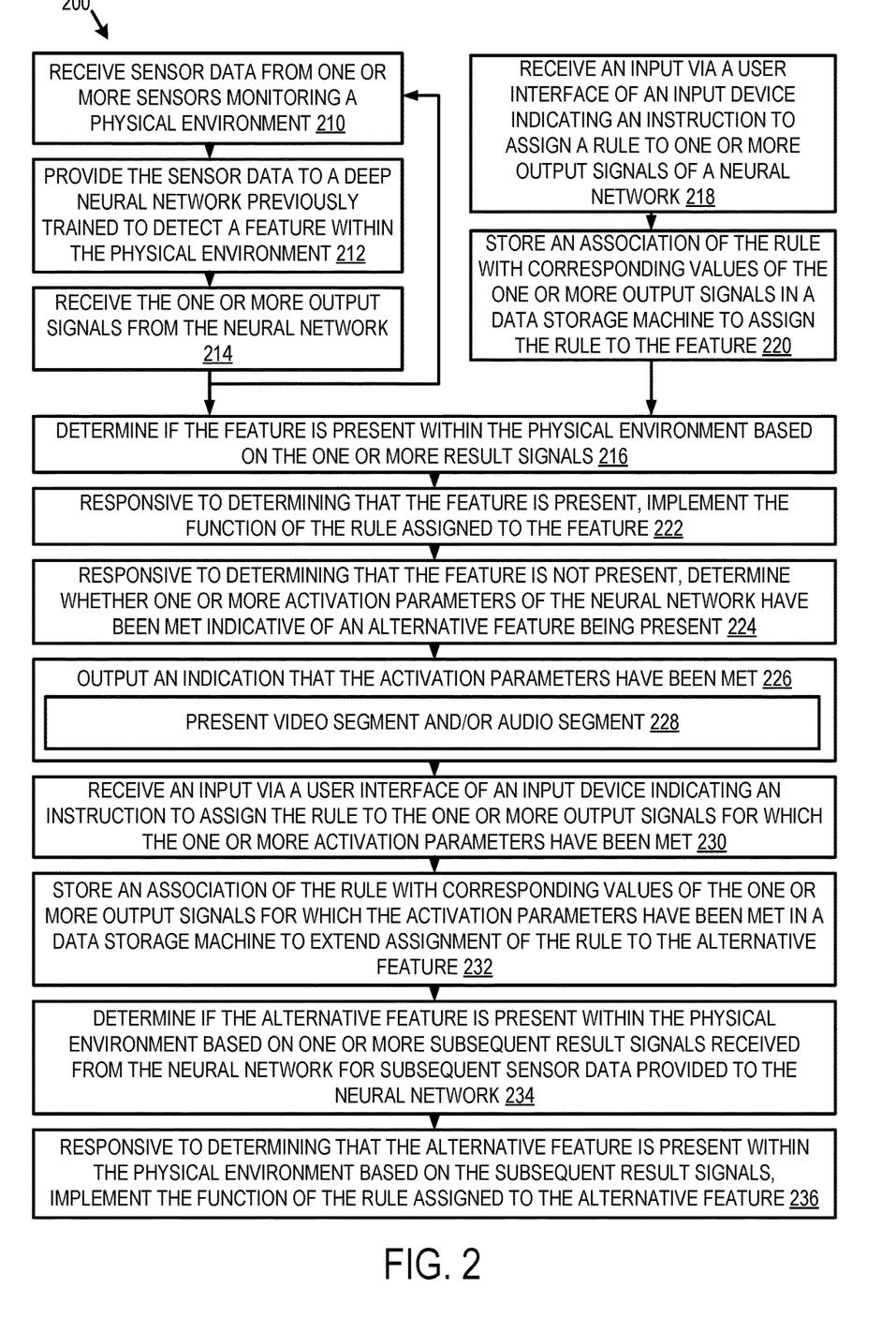
FIG. 2 is a flow diagram depicting an example method performed by a computing system.

FIG. 2 is a flow diagram depicting an example method 200 that may be performed by a computing system. An example computing system that may perform method 200 is described in further detail with reference to FIG. 6, which optionally may take the form of the tablet computer, personal assistant computer, and/or smart television of FIG. 1. In some implementations, method 200 may be enacted by a remote computing device providing cloud-based artificial intelligence services via a computer network.

At 210, the method includes receiving sensor data from one or more sensors monitoring a physical environment. As previously described with reference to FIG. 1, sensors may include one or more cameras, and one or more microphones. Alternatively or additionally, sensors may include ambient condition sensors (e.g., temperature, luminance, humidity, etc.), IoT (Internet of Things) sensors onboard corresponding IoT devices, or other suitable sensors. The sensor data may be received by the computing system from the sensors over wired and/or wireless communications links.

In at least some implementations, raw sensor data received from sensors may be pre-processed prior to providing the sensor data to a deep neural network for further processing. Such pre-processing may be used to filter sensor data of limited interest from the sensor data provided to a neural network. For example, raw video data received from a camera may be segmented into one or more image frames having a particular duration. Pre-processing may also be used to provide the sensor data to one or more input nodes of the neural network in a format that is suitable for those input nodes, such as the format that was used during previous training of the neural network.

At 212, the method includes providing the sensor data in raw and/or pre-processed forms to a deep neural network that was previously trained to detect one or more features within the physical environment. The deep neural network may have a plurality of connected nodes including one or more input nodes arranged in an input layer that receive the sensor data, one or more intermediate nodes arranged in one or more intermediate layers that receive output signals from the input nodes, and one or more output nodes arranged in an output layer that receive output signals from the intermediate layers and output one or more result signals responsive to the sensor data being received by the one or more input nodes.

At 214, the method includes receiving the one or more result signals from the deep neural network. The one or more result signals may or may not be indicative of a previously trained feature being present within the physical environment monitored by the sensors. Operations 210, 212, and 214 may be repeated at suitable, in some cases predetermined, sampling intervals to provide continuous or semi-continuous monitoring of the physical environment for the presence of a previously trained feature.

At 216, the method includes determining if a previously trained feature is present within the physical environment based on the one or more result signals output from the neural network. In at least some implementations, post processing of the result signals from the neural network may be performed to determine whether the feature is present within the physical environment. As an example, each result signal from the neural network may take the form of a resulting weight or confidence value, and post processing may be used to compare the weight value to an activation threshold for node to determine whether it has been met by the weight value. In the case of multiple result signals from the neural network, post processing may include applying a function to a combination of the weight values of each of the result signals to obtain a combined result from the neural network, which could be then compared to an activation threshold for the feature to determine whether the activation threshold has been met by the combined result. In each of these examples, satisfaction of the activation threshold may be used to indicate whether the feature is present within the physical environment.

Within the context of detecting a previously trained feature, an activated output layer of the neural network refers to one or more output nodes outputting result signals that indicate the presence of the previously trained feature. Hence, the output layer may be referred to as being activated if one or more previously trained features are detected by the neural network, as indicated by relatively high output weights or confidences. By contrast, the output layer may be referred to as not being activated if the one or more result signals output by the output nodes of the neural network are not indicative of a previously trained feature being present within the physical environment, as indicated by relatively low output weights or confidences. Similar terminology may be applied to intermediate and input layers of the neural network and to individual nodes within the output layer, intermediate layer, or input layer of the neural network with reference to whether a previously trained feature was detected based on the one or more result signals output by the neural network.

In at least some implementations, a rule may be assigned to a detected feature or to the result signals of a neural network that indicate that the feature is present within the physical environment. For example, at 218, the method includes receiving an input via a user interface of an input device indicating an instruction to assign a rule to one or more result signals of a neural network corresponding to the feature being present within the physical environment.

A feature may refer to any measurable aspect of a physical feature or physical phenomenon within a physical environment that may be observed by one or more sensors. Non-limiting examples of features include a physical object (e.g., a ball) or physical phenomenon (e.g., a sound), a physical state (e.g., positioning, speed, acceleration, appearance, content, sound volume level, etc.) of a physical object or physical phenomenon, presence of or physical interaction between two or more physical objects, an occurrence of two or more physical phenomena, etc.

A rule may define an association between one or more previously trained features and one or more functions to be implemented by a computing system upon detecting the one or more previously trained features. As an example, a rule may define an association between a first feature (e.g., a football) and a second feature (e.g., the first feature moving at a sufficiently high rate of speed) with a first function (e.g., output of an audible notification via a speaker) and a second function (e.g., transmit a notification to a remote computing system over a communications network). This rule may be further associated with a semantic label, such as "throwing football in the house" to provide a human-readable descriptor for the rule.

At 220, the method includes storing an association of the rule in a data storage machine with corresponding values of the one or more result signals that correspond to the detected feature. For example, each rule may be represented in program data by a rule profile that further defines the assigned features, associated functions, and result signals output by the neural network responsive to detecting such features.

At 222, the method includes, responsive to determining that the feature is present within the physical environment based on the one or more result signals, implementing a function of a rule assigned to the feature. As previously described with reference to operations 218 and 220, a rule having a function may have been previously assigned to a feature.

Non-limiting examples of functions include outputting an indication of the detected feature to a target device or to a target program. As an example, a function may include transmitting a communication over a communication network to a target recipient that includes an indication that the feature is present within the physical environment. As another example, a function may include outputting an indication that the feature is present within the physical environment via an output device of the computing system. As yet another example, a function may include storing a segment of the sensor data that resulted in the result signal indicating the feature being present within the physical environment for subsequent playback via an output device.

At 224, the method includes, responsive to determining that the feature is not present within the physical environment based on the one or more result signals, determining whether one or more activation parameters of the neural network nonetheless have been met. In other words, even if a previously trained feature/scenario (e.g., football kicked in house) is not detected, the neural network may be sufficiently activated to indicate that a related alternative feature may be present within the physical environment (e.g., soccer ball kicked).

As an example, even if the result signal output by the neural network is not of sufficient weighting or confidence to positively identify the previously trained feature, the neural network may have several "active" nodes that demonstrate what would be a threshold confidence. Various requirements can be set for what constitutes a node activation and/or how many and which nodes can be activated to satisfy an activation parameter of the neural network. If the activation parameter is satisfied (e.g., a relatively larger number of nodes are activated), an alternative feature may be responsible.

In at least some implementations, one or more activation parameters may be defined by relaxing an activation threshold of one or more nodes of the neural network. For each such node, an activation threshold of that node may be relaxed to obtain a relaxed activation threshold for the node in relation to the activation threshold for the node by which the one or more result signals output by the neural network are indicative of the feature being present. For example, an activation threshold for a node may be relaxed by a pre-defined level or scaled to obtain a relaxed activation threshold for that node. Relaxation of the activation threshold of one or more nodes may be performed at intermediate layers of the neural network, at input nodes, and/or at output nodes, depending on implementation.

Relaxation may alternatively or additionally be performed on a layer of nodes. For example, the one or more activation parameters may include a relaxed activation threshold for an intermediate layer of a neural network containing a plurality of intermediate nodes that is relaxed in relation to an activation threshold for that intermediate layer by which the one or more result signals output by the deep neural network are indicative of the feature being present. At the layer level, for example, relaxation may take the form of a relaxed threshold quantity of nodes of that layer that are to be activated as compared to a threshold quantity of nodes of that layer by which the one or more result signals output by the deep neural network are indicative of the feature being present.

The pre-determined level or scaling applied to activation thresholds to obtain relaxed activation thresholds may be dependent upon one or more factors, including a depth of a node or layer within the neural network, learned values, and/or user settings. As an example, nodes or layers closer to an output node or output layer may be relaxed more or less as compared to nodes or layers further upstream from the output node or output layer. This approach recognizes that aspects of a feature to be detected by a neural network become more specific and less generalized as the input data is processed downstream through the nodes of the neural network to the eventual result signal output by the neural network.

At 226, the method includes outputting an indication that the one or more activation parameters have been met. In at least some implementations, the indication that the one or more activation parameters have been met may be output via a user interface of an output device. For example, the indication may include a human-readable notification. Alternatively or additionally, the indication may include or be accompanied by a video segment and/or audio segment of the sensor data that resulted in the one or more activation parameters having been met, enabling a user to review the alternative feature detected by the neural network. For example, at 228, the notification and/or video segment/audio segment may be presented via an output device, enabling a user to review the input data (e.g., video from camera and/or audio from microphone) that resulted in the one or more activation parameters having been met.

At 230, the method includes receiving an input via a user interface of an input device indicating an instruction to assign a rule (e.g., a previously assigned rule) to the alternative feature and/or to the one or more result signals of the neural network for which the one or more activation parameters have been met. This operation may be similar to the operation previously described at 218, for example.

At 232, the method includes storing an association of the rule with the alternative feature and/or the one or more result signals for which the one or more activation parameters have been met in a data storage machine to extend assignment of the rule to the alternative feature. For example, this operation may be similar to the operation previously described at 220. In at least some implementations, an association of the rule, the alternative feature, and/or the one or more results signals with corresponding relaxed threshold values of the neural network may be stored in the data storage machine as part of operation 232.

At 234, the method includes determining if the alternative feature is present within the physical environment based on one or more subsequent result signals received from the neural network after processing subsequent sensor data. The subsequent sensor data may be received as previously described with reference to operation 210, and operations 212 and 214 may be similarly performed with respect to the neural network to obtain the one or more subsequent result signals.

At 236, method 200 includes, responsive to determining that the alternative feature is present within the physical environment based on the one or more subsequent result signals, implementing the function of the rule assigned to the alternative feature. Operation 236 may be similarly performed as previously described operation 222 to implement the function of the rule assigned to both the alternative feature and the original, previously trained feature.

In at least some examples, the alternative feature may represent a genus or a species of a genus of which the original, previously trained feature is a species. For example, if the original, previously trained feature is a football having a spheroid shape, the alternative feature may be a ball having a spherical shape. By providing users with an opportunity to extend rules to alternative features that are similar or related to previously trained features, the computing system may provide a more intuitive approach to using and interacting with rule-based services.

Figure 3:
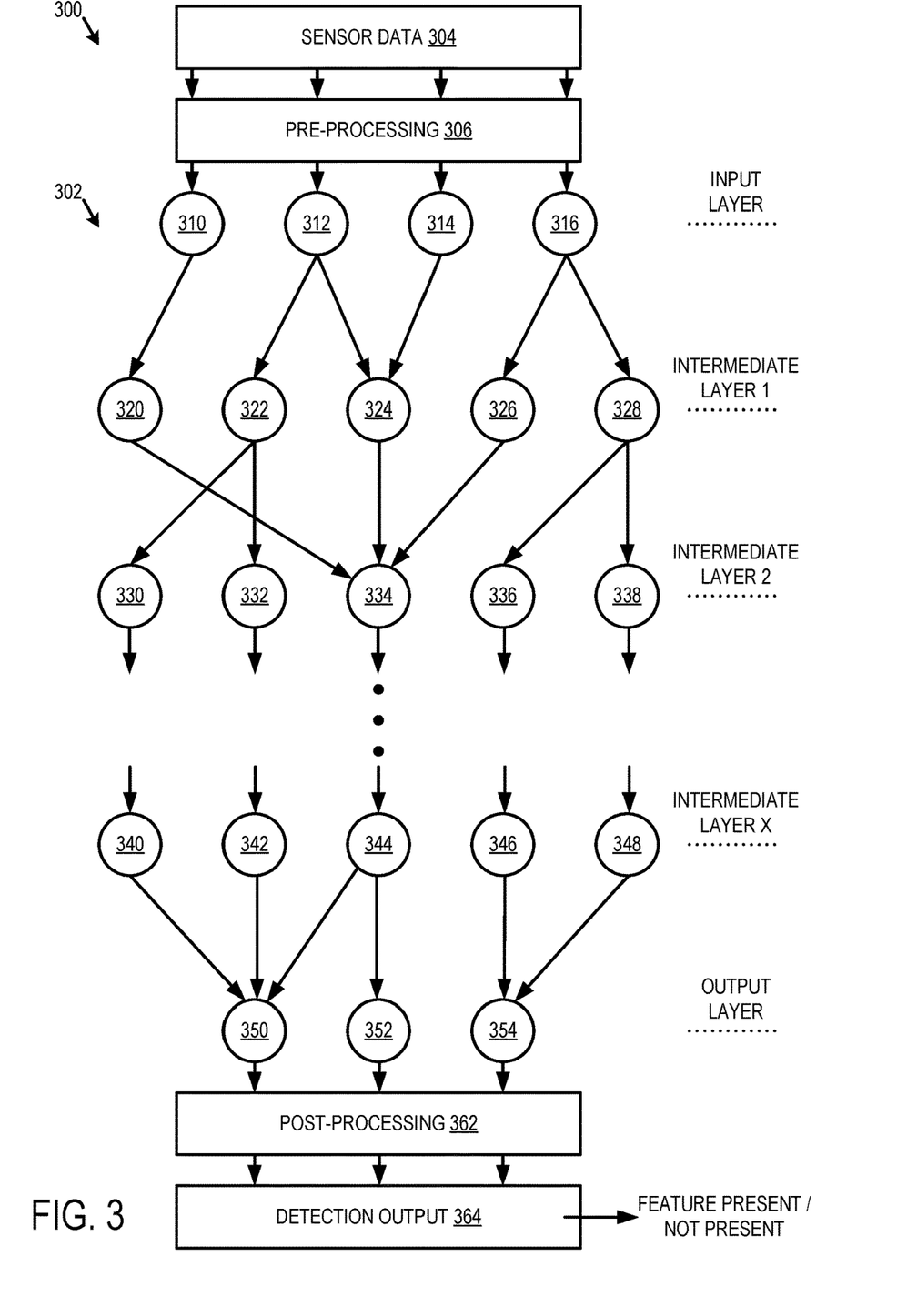
FIG. 3 is a schematic diagram depicting an example neural network.

FIG. 3 is a schematic diagram depicting an example processing pipeline 300, which contains a deep neural network 302. Sensor data 304 originating from one or more sensors may be pre-processed at 306 prior to being provided to deep neural network 302, for example, as previously described with reference to FIG. 2.

Deep neural network 302 has a plurality of connected nodes, including one or more input nodes and one or more output nodes. In this example, deep neural network 302 includes input nodes 310-316 that receive the sensor data in raw and/or processed forms. The one or more input nodes may be referred to as belonging to an input layer. Also in this example, deep neural network 302 includes output nodes 350-354 that output one or more result signals responsive to the sensor data being received by the one or more input nodes. The one or more output nodes may be referred to as belonging to an output layer.

Deep neural network 302 may further include a plurality of intermediate nodes arranged in one or more intermediate layers that descend through the network between the one or more input nodes and the one or more output nodes. For example, a first intermediate layer includes intermediate nodes 320-328, a second intermediate layer includes intermediate nodes 330-338, and yet another intermediate layer ("Layer X") includes intermediate nodes 340-348. Within the context of deep neural networks, tens, hundreds, thousands, or more intermediate layers may be arranged between an input layer and an output layer of the neural network, and each layer may include any suitable quantity of nodes.

"Deep neural network" may be used herein to refer to any neural network architecture with at least one layer of intermediate nodes (e.g., one or more "hidden" layers) between input nodes and output nodes of the neural network. A node in a particular hidden layer of the deep neural network may be configured to assess an activation parameter based on upstream layers of the deep neural network (e.g., based on the input layer and other layers in between the input layer and the particular hidden layer). In some examples, a node may be a weighted sum node configured to assess the activation parameter based on a weighted sum of activation parameters of upstream layers. In some examples, the activation parameter output by the weighted sum node may be based on a result of applying a non-linear function to the weighted sum. A deep neural network may be based on any suitable non-linear functions, e.g., sigmoid activation functions such as hyperbolic tangent or logistic sigmoid functions, and/or rectified linear functions.

Functions in an implementation of the deep neural network (e.g., functions for computing weighted sums, and non-linear functions as described above) may be differentiable functions, e.g., so that a derivative and/or gradient of the functions may be assessed with regard to parameters of the deep neural network and with regard to training data (e.g., labelled examples in supervised training). Accordingly, a gradient for each layer of the deep neural network may be assessed with the backpropagation algorithm, e.g., by repeated application of the "chain rule" for derivatives to compute the gradient at a hidden layer based on the activation of the hidden layer and a gradient at a downstream layer. The gradient assessed for each layer may be used to iteratively adjust learnable parameters of the deep neural network. For example, the deep neural network may be optimized with regard to a task (e.g., with regard to accurately classifying labelled examples) by any suitable gradient-based optimization method, such as gradient descent or conjugate gradient methods.

The deep neural network may incorporate any other suitable layers and/or nodes. In some examples, the deep neural network may be configured as a deep convolutional neural network including one or more convolution layers and/or one or more pooling layers (e.g., max pooling layers). A deep neural network configured as a deep convolutional neural network may be suitable for assessing spatial and/or temporal relationships of input features and/or intermediate features. For example, when input features include image data, a deep convolutional neural network may be configured to convolve the image data with a plurality of different convolutional kernels, wherein each convolutional kernel is configured so that a result of the convolution may indicate a plurality of different particular visual features (e.g., lines, curves, corners) recognized in the image data. Accordingly, pooling layers of the deep convolutional neural network may be configured to summarize the result of the convolution, e.g., to indicate a smaller plurality of salient visual features. Similarly, when input features include temporal data (e.g., successive frames of video and/or audio data), the deep convolutional neural network may be configured to identify salient temporal features (e.g., to identify timing relationships between the frames).

In some examples, the deep neural network may include a recurrent and/or recursive neural network structure, wherein a node of the neural network is configured to assess an activation parameter based on a previous activation parameter of the same node. For example, the deep neural network may be configured to include one or more long short-term memory (LSTM) layers including one or more LSTM nodes. Alternately or additionally, the deep neural network may include one or more memory access nodes configured to access an associative memory, wherein determining a location in the associative memory from which to retrieve data is based on an activation parameter of the memory access node. For example, such associative memory may be based on a neural Turing machine and/or neural random-access machine. A deep neural network that includes recursive and/or recurrent structures may be configured to recognize potentially complicated temporal relationships among input data, e.g., timing, ordering, and/or causality relationships. Accordingly, the deep neural network may be suitable for recognizing sequences of events.

Alternately or additionally, the deep neural network may further include any other suitable nodes and/or layers, e.g., by incorporating other current and/or future state-of-the-art machine learning technologies.

Each intermediate node of deep neural network 302 may receive one or more input signals from one or more upstream nodes, determine one or more result signals responsive to the one or more input signals, and output the one or more result signals to one or more downstream nodes. For example, intermediate node 322 may receive an input signal from upstream node 312, and responsive to the input signal may provide result signals to downstream nodes 330 and 332. In at least some implementations, input and result signals within the neural network may take the form of a confidence value or weight value as determined by a node within a range of values. As a non-limiting example, a result signal from node 322 may include a confidence value of whether a particular color of pixels is present within an image frame. Downstream node 330 receiving this result signal from node 322 as an input signal, may output a confidence value of whether a contiguous region of the particular color of pixels has a particular size and/or shape within the image frame.

Result signals output by output nodes 350-354 of the output layer may be post processed at 362, such as previously described with reference to FIG. 2. A detection output 364 of whether the feature is present or not present based on the one or more result signals may be output at 364, such as previously described with reference to operation 216 of FIG. 2.

Figure 4:
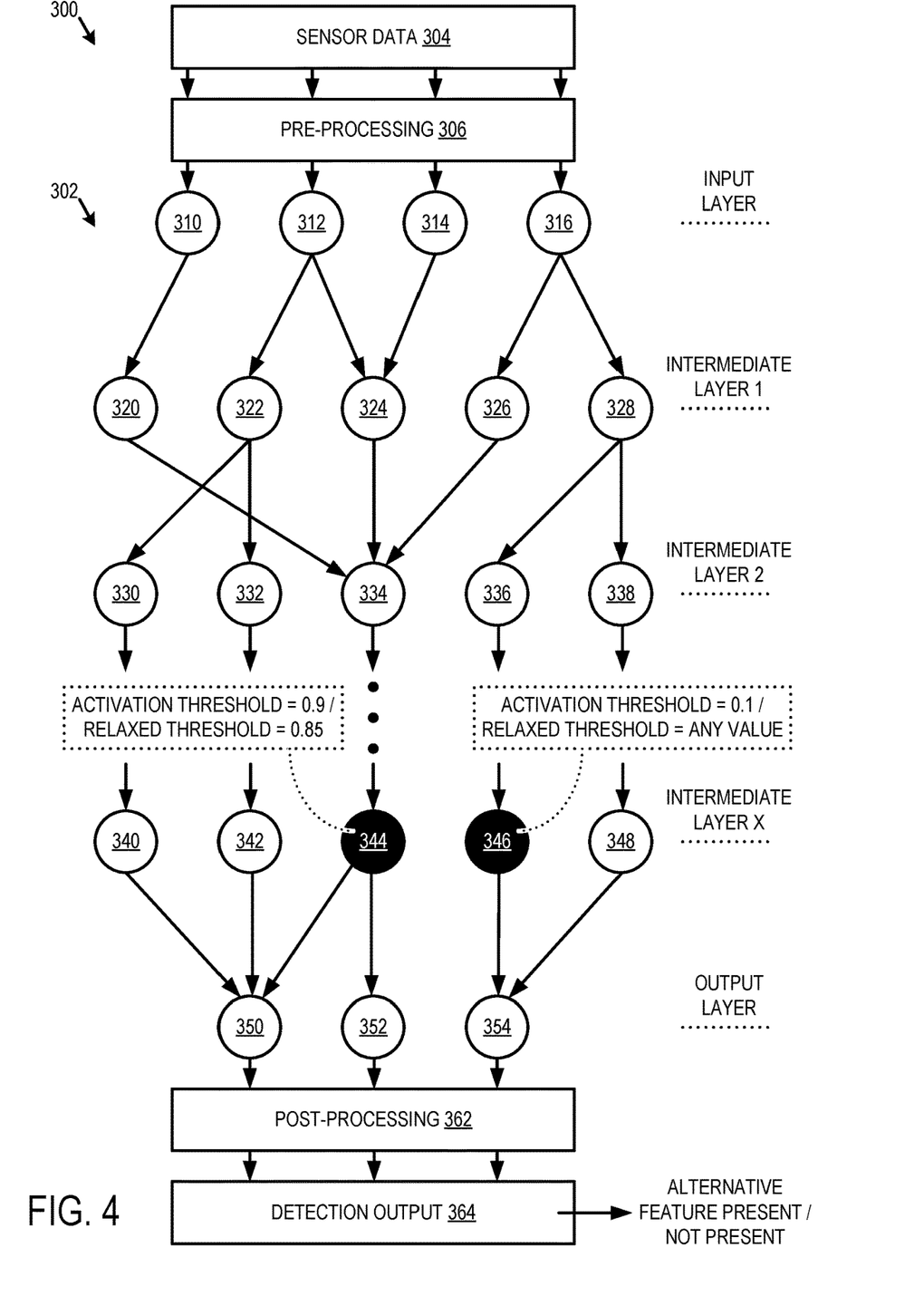
FIG. 4 is a schematic diagram depicting the neural network of FIG. 3 in modified form.

FIG. 4 is a schematic diagram depicting the neural network of FIG. 3 in modified form. In this example, activation thresholds of intermediate nodes 344 and 346 have been relaxed to potentially enable the neural network to detect alternative features that relate to a previously trained feature. An activation threshold (e.g., "0.9") has been relaxed for intermediate node 344 to obtain a relaxed activation threshold (e.g., "0.85"). For intermediate node 346, its activation threshold (e.g., "0.1") has been relaxed to obtain a relaxed activation threshold that corresponds to any value within a range of values for the activation threshold.

Figure 5:
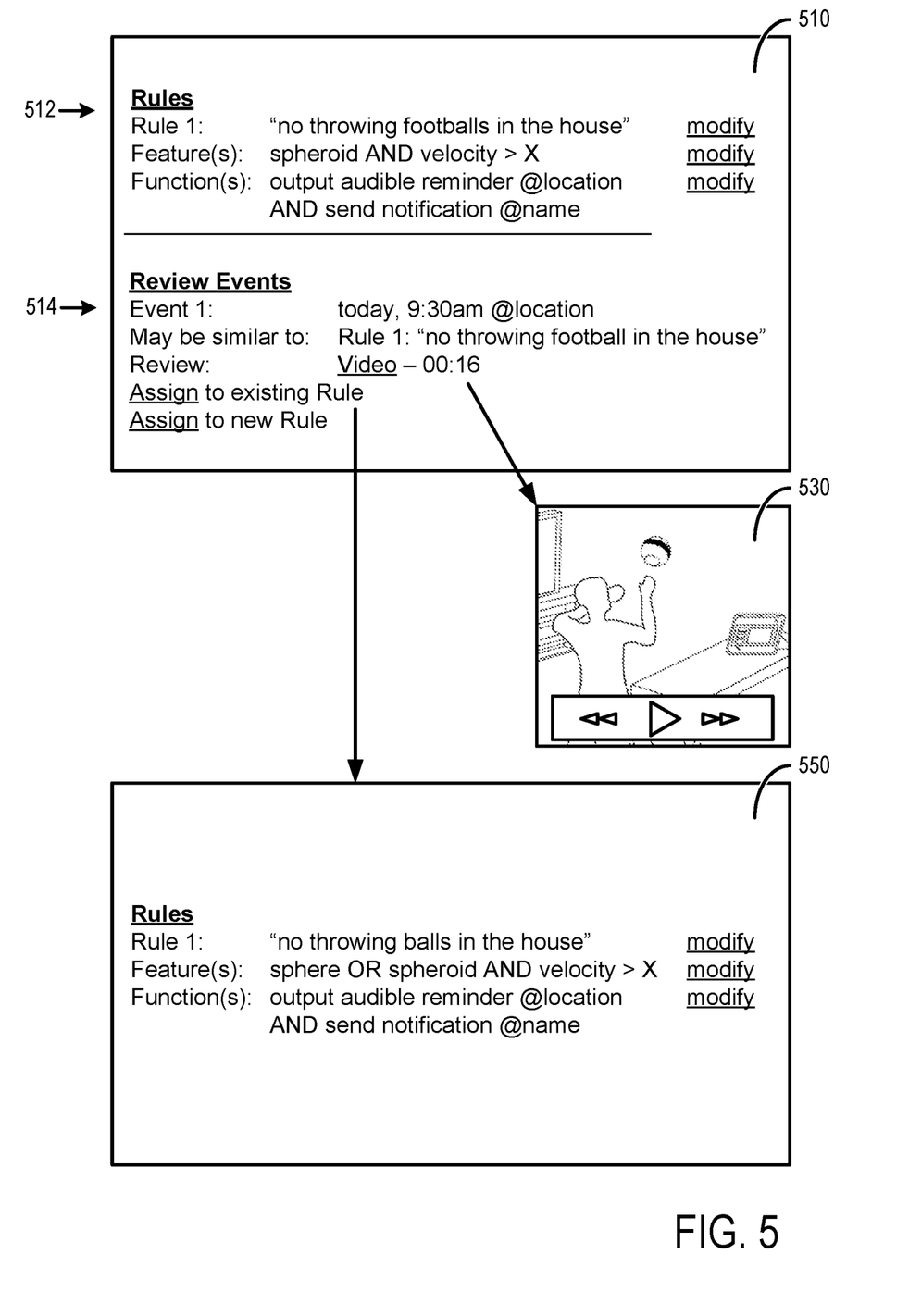
FIG. 5 depicts an example sequence of graphical user interfaces that enable a user to define a rule, review events, and modify a rule.

FIG. 5 depicts an example sequence of graphical user interfaces (GUIs) that enable a user to define a rule, review events, and modify a rule. The GUIs of FIG. 5 may, for example, be presented by a computing system via one or more display devices. As a non-limiting example, the GUIs of FIG. 5 may be accessed by an administrative user via a personal computing device of the computing system.

GUI 510 depicts an example rule review and modification tool 512. Aspects of an example rule (e.g., "Rule 1") are presented for review by GUI 510 that is semantically titled "no throwing footballs in the house". This rule includes functions such as a specified task (e.g., "output") having a specified subject matter (e.g., "audible reminder") at a specified location (e.g., "@location"), which may be used to instruct the computing system to audibly output a reminder (e.g., "no throwing footballs in the house") via a speaker at a location that refers to a user's home; and another specified task (e.g., "send") having a specified subject matter (e.g., "notification") to a specified identity (e.g., "@name"), which may be used to instruct the computing system to send a communication to a user notifying the user of the detected feature within the physical environment (e.g., "a football is being thrown in the house"). In at least some implementations, this notification may include or be linked to a tool that enables the user receiving the notification to connect their personal device to input devices and/or output devices at the location being monitored to directly observe and/or communicate with persons at that location in real-time (e.g., by outputting the user's voice communication—"I see that you are throwing a football in the house, please stop"). The example rule is assigned to one or more features detectable by the deep neural network, which may include in this example a physical object "spheroid" representing a football; and a state of that physical object "velocity greater than X" indicative of a football being thrown, for example. Each of the rule's semantic title, features, and functions may be modified through tool 512, for example, by accessing the corresponding "modify" links.

GUI 510 further depicts an event review tool 514 that enables a user to review events that were observed by the computing system, such as "Event 1", which occurred at a particular day, time, and location that corresponds to the user's home. In this example, the event did not result in detection of previously trained features to which Rule 1 is assigned, such as a football being thrown in the house. During training of the neural network to detect a football, the neural network may have been fed a set of images labeled spheroid (representing a shape of a football as the supervising signal) and another set of images labeled sphere (representing a shape that differs from a football), enabling the neural network to better distinguish a football having a spheroid shape from other objects having a spherical shape following training. However, the event did result in detection of alternative features to the previously trained features of Rule 1 due to one or more activation parameters of the neural network having been met. For example, the computing system may have detected another object in the shape of a sphere moving at a velocity that is greater than the threshold "X" for Rule 1.

A video segment that was captured via a camera of the computing system may be reviewed by the user, for example, within GUI 530. By reviewing the video segment depicting a person throwing or catching a spherical ball, the user may confirm that the rule is to be extended to include the spherical ball as a feature of the rule and its associated functions. Alternatively or additionally, a user may assign the detected feature that corresponds to a spherical ball to a new rule through interaction with tool 512.

In FIG. 5, the user has extended the rule to include the spherical ball as a feature, as depicted in GUI 550. For example, the semantic title for Rule 1 has been modified by the user to "no throwing balls in the house" to reflect that Rule 1 in modified form is more general than Rule 1 in its previous form. The features to which the rule is assigned has been modified to include the objects "sphere" in addition to "spheroid". Thereafter, the detection of either a sphere or a spheroid by the neural network may satisfy the rule, thereby directing the computing system to implement the functions associated with the rule.

In at least some implementations, the methods and processes described herein may be tied to a computing system of one or more computing devices. In particular, such methods and processes may be implemented as a computer-application program or service, an application-programming interface (API), a library, and/or other computer-program product.

Figure 6:
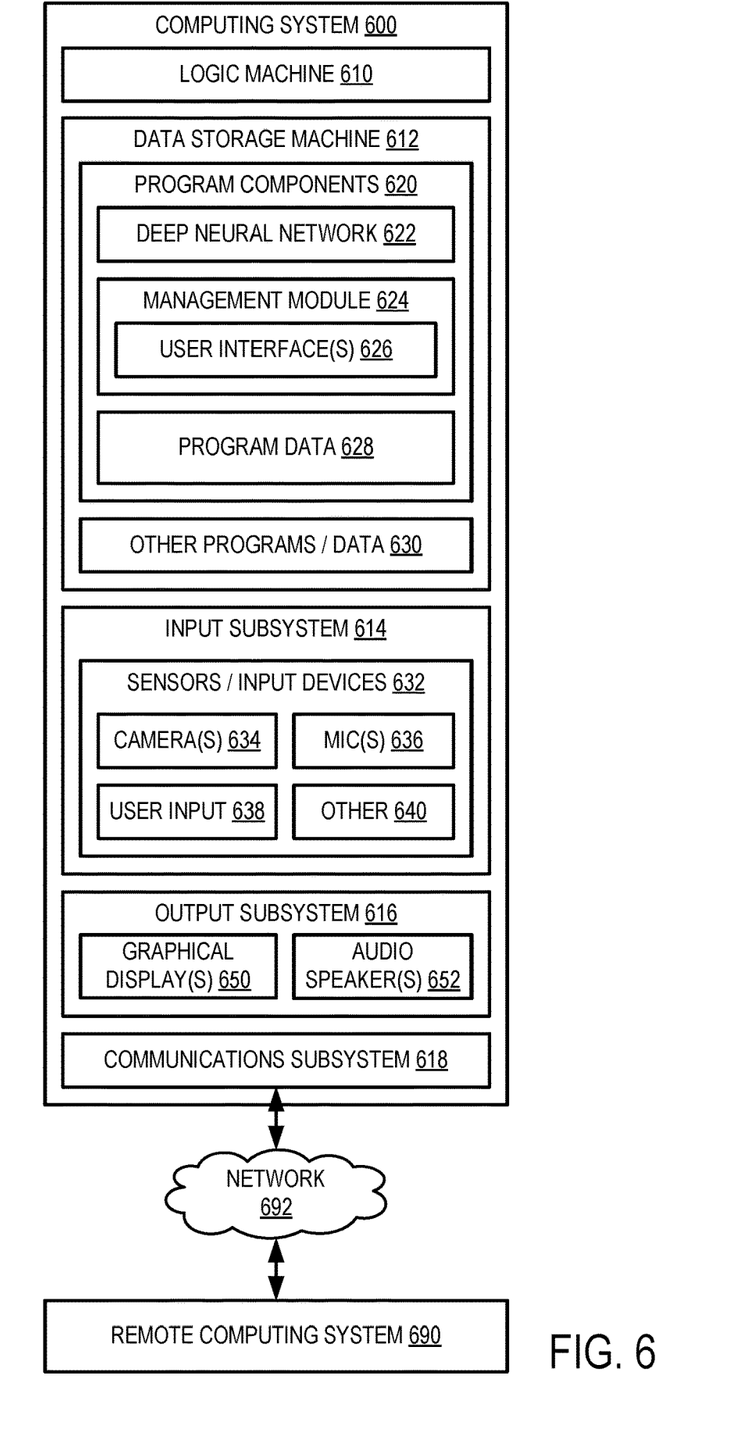
FIG. 6 is a schematic diagram depicting an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices. For example, the various devices depicted in FIG. 1 may form part of computing system 600, with additional processing being provided by one or more remote computing devices (e.g., a server system in a cloud computing configuration). Alternatively, all processing may be performed on-board an individual device (e.g., personal computer) in at least some implementations.

Computing system 600 includes a logic machine 612 and a data storage machine 614. Computing system 600 may further include an input subsystem 614, an output subsystem 616, a communication subsystem 618, and/or other components not shown in FIG. 6.

Logic machine 612 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 612 includes one or more physical devices configured to hold instructions executable by the logic machine to implement the methods and processes described herein. When such methods and processes are implemented, the state of storage machine 612 may be transformed—e.g., to hold different data. In FIG. 6, for example, storage machine 612 has program components 620 stored thereon, which may include a deep neural network 622, a management module 624 having one or more associated user interfaces 626, and program data 628. Collectively program components 620 may be executed and/or referenced by logic machine 610 to implement the methods and processes described herein.

Management module 624 may provide pre-processing and/or post-processing of data or signals provided to or obtained from neural network 622. Management module 624 may also maintain and modify associations between or among features detectable by neural network 622, and rules and their functions that may be implemented responsive to detecting such features. These associations may be stored in program data 628, for example. User interfaces 626 may enable a user to access tools of management module 624 that instruct the management module to modify or implement the rules, such as previously described with reference to the GUIs of FIG. 5. Management module 624 may further support the relaxing of activation thresholds of neural network 622. In at least some implementations, management module 624 may obtain, analyze, or store input and/or output values or signals of for each node and/or layer of the neural network. Storage machine 612 may include other programs and/or data 630 stored thereon that reside outside of program components 620.

Storage machine 612 may include removable and/or built-in devices. Storage machine 612 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 612 may include volatile, nonvolatile, dynamic, static, read/write, read-only, random-access, sequential-access, location-addressable, file-addressable, and/or content-addressable devices.

It will be appreciated that storage machine 612 includes one or more physical devices. However, aspects of the instructions described herein alternatively may be propagated by a communication medium (e.g., an electromagnetic signal, an optical signal, etc.) that is not held by a physical device for a finite or significant duration.

Aspects of logic machine 610 and storage machine 612 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 610 executing instructions held by storage machine 612. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, input subsystem 614 may comprise or interface with one or more sensors such as one or more cameras 634, microphones 636, etc. and/or user-input devices 638 such as a keyboard, mouse, touch screen, game controller, etc., among other suitable sensors and/or input devices depicted at 640. In at least some implementations, the input subsystem may comprise or interface with selected natural user input (NUI) componentry. Such componentry may be integrated or peripheral, and the transduction and/or processing of input actions may be handled on- or off-board. Example NUI componentry may include a microphone (e.g. 636) for speech and/or voice recognition; an infrared, color, stereoscopic, and/or depth camera (e.g., 634) for machine vision and/or gesture recognition; a head tracker, eye tracker, accelerometer, and/or gyroscope (e.g., as examples of other sensors/input devices 640) for motion detection and/or intent recognition; as well as electric-field sensing componentry for assessing brain activity.

When included output subsystem 616 may include one or more graphical displays 650 of a display subsystem and/or audio speakers 652 of an audio subsystem. Graphical displays 650 and/or audio speakers 652 may be used to present video/image and/or audio data for review by a user, such as with regard to detected features or alternative features to which rules may be extended. When included, the display subsystem may be used to present a visual representation of data held by storage machine 612. This visual representation may take the form of a graphical user interface (GUI) (e.g., of user interfaces 626), such as previously described with reference to FIG. 5, for example. As the herein described methods and processes change the data held by the storage machine, and thus transform the state of the storage machine, the state of the display subsystem may likewise be transformed to visually represent changes in the underlying data. The display subsystem may include the one or more graphical displays 650 utilizing virtually any type of technology. Such display devices may be combined with logic machine 610 and/or storage machine 612 in a shared enclosure, or such display devices may be peripheral display devices. Similarly, logic machine 610 and/or storage machine 612 may be combined in a shared enclosure with audio speakers 652, or such audio speakers may be peripheral devices.

When included, communication subsystem 618 may be configured to communicatively couple computing system 600 with one or more other computing systems or computing devices, such as example computing system 690. Communication subsystem 618 may include wired and/or wireless communication devices compatible with one or more different communication protocols. As non-limiting examples, the communication subsystem may be configured for communication via a wireless telephone network, or a wired or wireless local- or wide-area computer network. In at least some implementations, the communication subsystem may allow computing system 600 to send and/or receive messages to and/or from other devices via a network 692 such as the Internet or a portion thereof.

In at least some implementations, computing system 600 may provide program data to remote computing system 690 (e.g., in the form of a server system), including rules established by users of computing system 600, their associated functions and features, and the result signals output by the neural network for such features. This sharing of program data may enable remote instances of a neural network or other program components (e.g., at another client computing system) to be updated or retrained to detect alternative features that are similar or related to previously trained features, and to enable users of other computing systems to more easily extend rules to such alternative features.

According to an aspect of the present disclosure, an example computing system comprises one or more sensors including at least a camera to monitor a physical environment; a logic machine; and a data storage machine having instructions stored thereon including a deep neural network previously trained to detect a feature within the physical environment, the instructions executable by the logic machine to: receive sensor data from the one or more sensors monitoring the physical environment; provide the sensor data to the deep neural network, the deep neural network having a plurality of connected nodes including: one or more input nodes that receive the sensor data, and one or more output nodes that output one or more result signals responsive to the sensor data being received by the one or more input nodes; receive the one or more result signals from the deep neural network; determine if the feature is present within the physical environment based on the one or more result signals; responsive to determining that the feature is present within the physical environment based on the one or more result signals, implement a function of a rule assigned to the feature; responsive to determining that the feature is not present within the physical environment based on the one or more result signals, determine whether one or more activation parameters of the deep neural network have been met indicative of an alternative feature being present within the physical environment; and output an indication that the one or more activation parameters have been met. In this example or any other example disclosed herein, the one or more activation parameters are defined by relaxing an activation threshold of one or more nodes of the deep neural network to obtain a relaxed activation threshold in relation to the activation threshold by which the one or more result signals output by the deep neural network are indicative of the feature being present. In this example or any other example disclosed herein, the one or more nodes of the deep neural network for which the activation threshold is relaxed include one or more intermediate nodes of the deep neural network located between the one or more input nodes and the one or more output nodes. In this example or any other example disclosed herein, the one or more activation parameters further include a relaxed activation threshold for an intermediate layer containing a plurality of intermediate nodes of the deep neural network that is relaxed in relation to an activation threshold for that intermediate layer by which the one or more result signals output by the deep neural network are indicative of the feature being present. In this example or any other example disclosed herein, the indication that the one or more activation parameters have been met is output via a user interface of an output device. In this example or any other example disclosed herein, the indication includes or is accompanied by a video segment and/or audio segment of the sensor data that resulted in the one or more activation parameters having been met. In this example or any other example disclosed herein, the instructions are further executable by the logic machine to: receive an input via a user interface of an input device indicating an instruction to assign the rule to the one or more result signals for which the one or more activation parameters have been met; and store an association of the rule with corresponding relaxed threshold values of the one or more result signals for which the one or more activation parameters have been met in a data storage machine to extend assignment of the rule to the alternative feature. In this example or any other example disclosed herein, the instructions are further executable by the logic machine to: determine if the alternative feature is present within the physical environment based on one or more subsequent result signals received from the deep neural network for subsequent sensor data provided to the deep neural network; and responsive to determining that the alternative feature is present within the physical environment based on the one or more subsequent result signals, implement the function of the rule assigned to the alternative feature. In this example or any other example disclosed herein, the function includes transmitting a communication over a communication network to a target recipient that includes an indication that the feature is present within the physical environment. In this example or any other example disclosed herein, the function includes outputting an indication that the feature is present within the physical environment via an output device of the computing system. In this example or any other example disclosed herein, the function includes storing a segment of the sensor data that resulted in the result signal indicating the feature being present within the physical environment for subsequent playback via an output device. In this example or any other example disclosed herein, the alternative feature represents a genus of which the feature is a species.

According to another aspect of the present disclosure, an example method performed by a computing system comprises: receiving sensor data from one or more sensors monitoring a physical environment; providing the sensor data to a deep neural network previously trained to detect a feature within the physical environment, the deep neural network having a plurality of connected nodes including: one or more input nodes that receive the sensor data, and one or more output nodes that output one or more result signals responsive to the sensor data being received by the one or more input nodes; receiving the one or more result signals from the deep neural network; determining if the feature is present within the physical environment based on the one or more result signals; responsive to determining that the feature is present within the physical environment based on the one or more result signals, implementing a function of a rule assigned to the feature; responsive to determining that the feature is not present within the physical environment based on the one or more result signals, determining whether one or more activation parameters of the deep neural network have been met indicative of an alternative feature being present within the physical environment; and outputting an indication that the one or more activation parameters have been met. In this example or any other example disclosed herein, the method further comprises defining the one or more activation parameters by relaxing an activation threshold of one or more nodes of the deep neural network to obtain a relaxed activation threshold in relation to the activation threshold by which the one or more result signals output by the deep neural network are indicative of the feature being present. In this example or any other example disclosed herein, the one or more nodes of the deep neural network for which the activation threshold is relaxed include one or more intermediate nodes of the deep neural network located between the one or more input nodes and the one or more output nodes. In this example or any other example disclosed herein, the one or more activation parameters further include a relaxed activation threshold for an intermediate layer containing a plurality of intermediate nodes of the deep neural network that is relaxed in relation to an activation threshold for that intermediate layer by which the one or more result signals output by the deep neural network are indicative of the feature being present. In this example or any other example disclosed herein, outputting the indication that the one or more activation parameters have been met includes: outputting the indication via a user interface of an output device, wherein the indication includes or is accompanied by a video segment and/or audio segment of the sensor data that resulted in the one or more activation parameters having been met. In this example or any other example disclosed herein, the method further comprises: receiving an input via a user interface of an input device indicating an instruction to assign the rule to the one or more result signals for which the one or more activation parameters have been met; and storing an association of the rule with corresponding values of the one or more result signals for which the one or more activation parameters have been met in a data storage machine to extend assignment of the rule to the alternative feature. In this example or any other example disclosed herein, the method further comprises: determining if the alternative feature is present within the physical environment based on one or more subsequent result signals received from the deep neural network for subsequent sensor data provided to the deep neural network; and responsive to determining that the alternative feature is present within the physical environment based on the one or more subsequent result signals, implementing the function of the rule assigned to the alternative feature.

According to another aspect of the present disclosure, an example computing system comprises: one or more computing devices configured to: receive sensor data from one or more sensors monitoring a physical environment; provide the sensor data to a deep neural network, the deep neural network previously trained to detect the feature, and having a plurality of connected nodes including: one or more input nodes that receive the sensor data, one or more output nodes that output one or more result signals responsive to the sensor data being received by the one or more input nodes, and one or more intermediate nodes that receive output signals from the one or more input nodes and provide output signals to the one or more output nodes through one or more intermediate layers of the one or more intermediate nodes; receive the one or more result signals from the deep neural network; determine if the feature is present within the physical environment based on the one or more result signals; responsive to determining that the feature is present within the physical environment based on the one or more result signals, implement a function of a rule assigned to the feature; responsive to determining that the feature is not present within the physical environment based on the one or more result signals, determine whether one or more activation parameters of the deep neural network have been met indicative of an alternative feature being present within the physical environment, the alternative feature including one or more of; a relaxed activation threshold for one or more intermediate nodes of the deep neural network, and/or a relaxed activation threshold for one or more intermediate layers of the deep neural network; and output an indication that the one or more activation parameters have been met.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A computing system, comprising:
one or more sensors including at least a camera to monitor a physical environment;
a logic machine; and
a data storage machine having instructions stored thereon including a deep neural network previously trained to detect a feature within the physical environment, the instructions executable by the logic machine to:
receive sensor data from the one or more sensors monitoring the physical environment;
provide the sensor data to the deep neural network, the deep neural network having a plurality of connected nodes including:
one or more input nodes that receive the sensor data, and one or more output nodes that output one or more result signals responsive to the sensor data being received by the one or more input nodes;
receive the one or more result signals from the deep neural network;
determine whether the feature is present or not present within the physical environment based on the one or more result signals;
responsive to determining that the feature is present within the physical environment based on the one or more result signals, implement a function of a rule assigned to the feature;
responsive to determining that the feature is not present within the physical environment based on the one or more result signals, determine whether one or more activation parameters of the deep neural network have been met indicative of an alternative feature being present within the physical environment; and
output an indication that the one or more activation parameters have been met.

2. The computing system of claim 1, wherein the one or more activation parameters are defined by relaxing an activation threshold of one or more nodes of the deep neural network to obtain a relaxed activation threshold in relation to the activation threshold by which the one or more result signals output by the deep neural network are indicative of the feature being present.

3. The computing system of claim 2, wherein the one or more nodes of the deep neural network for which the activation threshold is relaxed include one or more intermediate nodes of the deep neural network located between the one or more input nodes and the one or more output nodes.

4. The computing system of claim 1, wherein the one or more activation parameters further include a relaxed activation threshold for an intermediate layer containing a plurality of intermediate nodes of the deep neural network that is relaxed in relation to an activation threshold for that intermediate layer by which the one or more result signals output by the deep neural network are indicative of the feature being present.

5. The computing system of claim 1, wherein the indication that the one or more activation parameters have been met is output via a user interface of an output device.

6. The computing system of claim 5, wherein the indication includes or is accompanied by a video segment and/or audio segment of the sensor data that resulted in the one or more activation parameters having been met.

7. The computing system of claim 6, wherein the instructions are further executable by the logic machine to:
receive an input via a user interface of an input device indicating an instruction to assign the rule to the one or more result signals for which the one or more activation parameters have been met; and
store an association of the rule with corresponding relaxed threshold values of the one or more result signals for which the one or more activation parameters have been met in a data storage machine to extend assignment of the rule to the alternative feature.

8. The computing system of claim 7, wherein the instructions are further executable by the logic machine to:
determine if the alternative feature is present within the physical environment based on one or more subsequent result signals received from the deep neural network for subsequent sensor data provided to the deep neural network; and
responsive to determining that the alternative feature is present within the physical environment based on the one or more subsequent result signals, implement the function of the rule assigned to the alternative feature.

9. The computing system of claim 1, wherein the function includes transmitting a communication over a communication network to a target recipient that includes an indication that the feature is present within the physical environment.

10. The computing system of claim 1, wherein the function includes outputting an indication that the feature is present within the physical environment via an output device of the computing system.

11. The computing system of claim 1, wherein the function includes storing a segment of the sensor data that resulted in the result signal indicating the feature being present within the physical environment for subsequent playback via an output device.

12. The computing system of claim 1, wherein the alternative feature represents a genus of which the feature is a species.

13. A method performed by a computing system, the method comprising:
receiving sensor data from one or more sensors monitoring a physical environment;
providing the sensor data to a deep neural network previously trained to detect a feature within the physical environment, the deep neural network having a plurality of connected nodes including:
one or more input nodes that receive the sensor data, and one or more output nodes that output one or more result signals responsive to the sensor data being received by the one or more input nodes;
receiving the one or more result signals from the deep neural network;
determine whether the feature is present or not present within the physical environment based on the one or more result signals;
responsive to determining that the feature is present within the physical environment based on the one or more result signals, implementing a function of a rule assigned to the feature;
responsive to determining that the feature is not present within the physical environment based on the one or more result signals, determining whether one or more activation parameters of the deep neural network have been met indicative of an alternative feature being present within the physical environment; and
outputting an indication that the one or more activation parameters have been met.

14. The method of claim 13, further comprising:
defining the one or more activation parameters by relaxing an activation threshold of one or more nodes of the deep neural network to obtain a relaxed activation threshold in relation to the activation threshold by which the one or more result signals output by the deep neural network are indicative of the feature being present.

15. The method of claim 14, wherein the one or more nodes of the deep neural network for which the activation threshold is relaxed include one or more intermediate nodes of the deep neural network located between the one or more input nodes and the one or more output nodes.

16. The method of claim 13, wherein the one or more activation parameters further include a relaxed activation threshold for an intermediate layer containing a plurality of intermediate nodes of the deep neural network that is relaxed in relation to an activation threshold for that intermediate layer by which the one or more result signals output by the deep neural network are indicative of the feature being present.

17. The method of claim 13, wherein outputting the indication that the one or more activation parameters have been met includes:
outputting the indication via a user interface of an output device, wherein the indication includes or is accompanied by a video segment and/or audio segment of the sensor data that resulted in the one or more activation parameters having been met.

18. The method of claim 17, further comprising:
receiving an input via a user interface of an input device indicating an instruction to assign the rule to the one or more result signals for which the one or more activation parameters have been met; and
storing an association of the rule with corresponding values of the one or more result signals for which the one or more activation parameters have been met in a data storage machine to extend assignment of the rule to the alternative feature.

19. The method of claim 18, further comprising:
determining if the alternative feature is present within the physical environment based on one or more subsequent result signals received from the deep neural network for subsequent sensor data provided to the deep neural network; and
responsive to determining that the alternative feature is present within the physical environment based on the one or more subsequent result signals, implementing the function of the rule assigned to the alternative feature.

20. A computing system, comprising: one or more computing devices configured to:
receive sensor data from one or more sensors monitoring a physical environment;
provide the sensor data to a deep neural network, the deep neural network previously trained to detect the feature, and having a plurality of connected nodes including:
one or more input nodes that receive the sensor data, one or more output nodes that output one or more result signals responsive to the sensor data being received by the one or more input nodes, and
one or more intermediate nodes that receive output signals from the one or more input nodes and provide output signals to the one or more output nodes through one or more intermediate layers of the one or more intermediate nodes;
receive the one or more result signals from the deep neural network;
determine whether the feature is present or not present within the physical environment based on the one or more result signals;
responsive to determining that the feature is present within the physical environment based on the one or more result signals, implement a function of a rule assigned to the feature;
responsive to determining that the feature is not present within the physical environment based on the one or more result signals, determine whether one or more activation parameters of the deep neural network have been met indicative of an alternative feature being present within the physical environment, the alternative feature including one or more of:
a relaxed activation threshold for one or more intermediate nodes of the deep neural network, and/or
a relaxed activation threshold for one or more intermediate layers of the deep neural network; and
output an indication that the one or more activation parameters have been met.

* * * * *